(12) United States Patent
Mitsuda

(10) Patent No.: US 7,827,121 B2
(45) Date of Patent: Nov. 2, 2010

(54) MAINTENANCE COST MANAGEMENT DEVICE AND USER DEVICE

(75) Inventor: Eiichi Mitsuda, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 928 days.

(21) Appl. No.: 10/250,396

(22) PCT Filed: Dec. 27, 2001

(86) PCT No.: PCT/JP01/11519

§ 371 (c)(1),
(2), (4) Date: Sep. 29, 2003

(87) PCT Pub. No.: WO02/052472

PCT Pub. Date: Jul. 4, 2002

(65) Prior Publication Data

US 2004/0215577 A1  Oct. 28, 2004

(30) Foreign Application Priority Data

Dec. 27, 2000  (JP)  ............... 2000-399007

(51) Int. Cl.
G06Q 99/00 (2006.01)

(52) U.S. Cl. ............... 705/400; 705/1.1; 705/4; 705/14.4; 705/34; 705/40; 358/1.1

(58) Field of Classification Search ............... 705/1, 705/34–35, 7, 400, 4, 26, 50, 1.1, 14.4; 358/1.18, 358/3.28, 1.1; 707/514
See application file for complete search history.

(56) References Cited

U.S. PATENT DOCUMENTS 6,141,629 A * 10/2000 Yamamoto et al. ......... 702/187
6,411,943 B1 * 6/2002 Crawford .................. 705/400
6,457,883 B1 * 10/2002 Silverbrook et al. ........ 400/62
6,662,090 B2 * 12/2003 Toyama et al. ............. 701/30

(Continued)

FOREIGN PATENT DOCUMENTS

JP   10-229587   8/1998

(Continued)

OTHER PUBLICATIONS

Schwartz, Ephraim, "Controlling the Clients", Aug. 28, 2000, InfoWorld, 22, 35, p. 1 (2 pgs).*

(Continued)

*Primary Examiner*—John W Hayes
*Assistant Examiner*—Freda A Nelson
(74) *Attorney, Agent, or Firm*—Hamre, Schumann, Mueller & Larson, P.C.

(57) ABSTRACT

A user of devices (1) to (3) pays a predetermined accumulated fee to a device maker through a finance company every month. For each device of each user, a server (B) of the maker converts the sum of the accumulative fee into maintenance points and stores them in a point management table (6). After maintenance, the server (B) subtracts the points corresponding to the maintenance charge from the maintenance points to settle the maintenance cost. Service points are given according to an operation record sent from the devices (1) to (3) through a communications network (5) and a discount is given corresponding to the service points when the maintenance cost is settled.

7 Claims, 1 Drawing Sheet

U.S. PATENT DOCUMENTS

| | | | |
|---|---|---|---|
| 6,882,439 B2 * | 4/2005 | Ishijima | 358/1.15 |
| 6,938,007 B1 * | 8/2005 | Iulianello et al. | 705/34 |
| 7,249,039 B2 * | 7/2007 | Yoshioka et al. | 705/4 |
| 2002/0004730 A1 * | 1/2002 | Yoshioka et al. | 705/4 |
| 2002/0052813 A1 * | 5/2002 | Kinugawa et al. | 705/34 |
| 2007/0038540 A1 * | 2/2007 | Tomita et al. | 705/35 |

FOREIGN PATENT DOCUMENTS

| | | | |
|---|---|---|---|
| JP | 2000205783 A * | 7/2000 | |
| JP | 2000-310643 | 11/2000 | |
| JP | 2000-346671 | 12/2000 | |

OTHER PUBLICATIONS

"New Maintenance System of Detached Houses Introduced—Tokyu Land Corporation", p. 22 of the Mar. 23, 1994 issue of the Nikkan Kogyo Shinbun, with its English translation.

"New-Type Affiliated Credit Card—Nippon Shinpan Co., Ltd.", p. 1 of the Feb. 29, 1996 issue of the Nikkei Business Daily, with its English translation.

* cited by examiner

MAINTENANCE COST MANAGEMENT DEVICE AND USER DEVICE

TECHNICAL FIELD

The present invention relates to maintenance cost management systems, which are systems that are configured through a communications network such as the Internet, and are used in order to settle accounts for device maintenance costs between a user of a device or the like, and a vendor who performs the maintenance for that device.

BACKGROUND ART

Along with the advancement of telecommunications technologies in recent years, it has become possible to provide the various types of devices, such as measuring devices, with a communication function, and to perform centralized management of data with remote operations and external commuters.

As with ordinary types of devices, devices that have a communication function also require repairs when they break down and replacements for consumables. In order to keep such devices in a stable condition, regular checkups and maintenance also are required. For these reasons, it is common for device makers and users to conclude a maintenance agreement before delivery of the device to the user, and when the device breaks down, or at predetermined times, the maker dispatches maintenance staff to the user, and maintenance is performed on the device within the scope of the agreement. Conventionally, it is common for the maker to bill the user for costs such as the labor and replacement parts required at the time of maintenance each time maintenance is performed.

However, in cases in which the repairs are for large-scale devices, for example, the billed maintenance costs sometimes become expensive beyond the expectations of the user, resulting in the problem that the user feels a sense of burden. Also, during regular maintenance, when it turns out that replacement parts are necessary, the costs of these replacement parts become unforeseen expenditures to the user, thus giving the same sense of burden.

DISCLOSURE OF INVENTION

In order to solve the above-described problems, it is an object of the present invention to provide a maintenance cost management system that can reduce a user's sense of burden for paying maintenance costs by letting the user accumulate maintenance costs, which the maker manages.

In order to achieve this object, the maintenance cost management device of the present invention is provided with a point storage portion that stores a user's maintenance points for a device that receives maintenance. An accumulative fee paid regularly by the device user is converted to points, and added to the device user's maintenance points stored in the point storage portion. After maintenance has been performed, a maintenance cost is settled by subtracting a number of points corresponding to the maintenance cost from the maintenance points in the point storage portion.

In this configuration, with the device user accumulating comparatively small amounts, every month for example, maintenance points are cumulated in the maintenance cost management device. And after maintenance is received, the maintenance cost is settled by deducting points corresponding to the maintenance cost from the maintenance points. In this way, a maintenance cost management device can be provided that makes it possible to reduce the user's sense of burden for paying maintenance costs. Moreover, by using this device, as the device user unknowingly cumulates points, the sense of good value for money is extremely high compared to a situation in which a user must accumulate points voluntarily, and this leads to promoting users to enter into maintenance agreements.

In the maintenance cost management device, it is preferable that, for each device of each user, the point storage portion is provided with an area that stores the maintenance points. This makes it possible for the business entity that performs maintenance to manage maintenance costs per device for the user.

In the maintenance cost management device, it is preferable that the point storage portion is further provided with a service point storage area that stores service points given in response to acts on the side of the device user side, and that the maintenance cost is settled taking into account the service points.

In this way, service points can be given, for example, in response to acts on the side of the user such as device usage and the purchase of parts. By taking these into account during settlement, it is possible to give preferential treatment, for example, to users who have a high level of device usage, or users who have made large-sum purchases, thus improving service to the user. On the other hand, by establishing service points, the provider of the device also has the advantages of being able to raise the frequency of the user's usage of the device, and being able to give an incentive to continue to use the maker's devices.

Furthermore, it is preferable that taking into account the service points when settling maintenance costs means adding the service points to the maintenance points. It is also preferable that the points subtracted from the maintenance points are calculated by discounting for a percentage corresponding to the service points. In essence, the user receives a discount for maintenance costs with either method, thus leading to improved service to the user. It should be noted that these methods can be used together.

Furthermore, in the maintenance cost management device, it is preferable that an operation record of a device user's device is received from that device via a communications network, and points calculated on the basis of the received operation record are added to the device user's service points stored in the point storage portion.

With this, the conditions of the user's usage of a device or the like can be reflected accurately and quickly in the service points, as it is possible to receive, as appropriate, the operation record of a device subject to maintenance via a communications network such as the Internet for example, and to establish service points based on the operation record. It should be noted that it is preferable that the operation record includes data related to the consumption volume of consumables for that device.

On the other hand, a user device that is connected via a communications network to the maintenance cost management device is provided with an operation record storage portion that stores an operation record, and a transmission portion that sends the operation record to the maintenance cost management device via the communications network. Furthermore, it is preferable that the operation record includes data related to the device's consumption volume of consumables.

Moreover, a program storage medium on which a program of the present invention is stored executes processes of converting an accumulative fee paid regularly by a device user into points, adding the points to the device user's maintenance points in a point storage portion storing the device user's maintenance points, and settling a maintenance cost after maintenance has been performed by subtracting points from the maintenance points in the point storage portion in accordance with the maintenance cost.

The maintenance cost management device of the present invention can be realized by having the program storage medium read by a computer and operated.

BEST MODE FOR CARRYING OUT THE INVENTION

Figure 1:
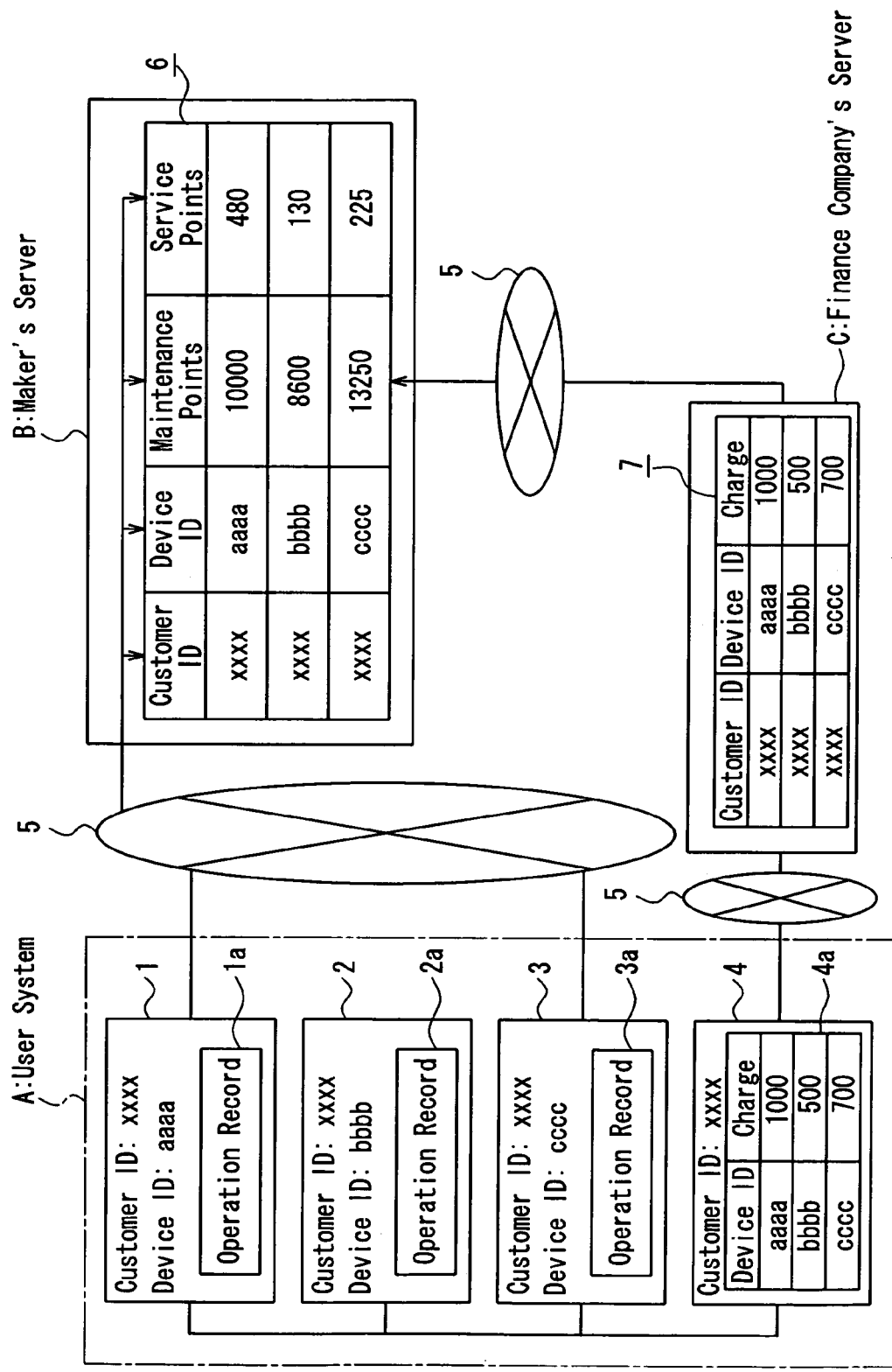
FIG. 1 is a diagram showing the general configuration of a maintenance cost management system according to an embodiment of the present invention.

Referring to the accompanying drawing, the following is an explanation of an embodiment of the present invention.

As shown in FIG. 1, the maintenance cost management system in this embodiment is made up of a device user's system A, a device maker's server B (maintenance cost management device), and a finance company's server C, which are interconnected by a communications network 5 such as the Internet.

Devices 1 to 3 in the user's system A have been purchased from the device maker, and are subject to maintenance by the device maker. The devices 1 to 3 are connected over a LAN or the like within the user's system A to a computer 4. Furthermore, the devices 1 to 3 have a communication function (not shown in the diagram), and communicate data to the maker's server B via the communications network 5. Each user is given a unique customer ID by the maker. Furthermore, each device is also given a unique device ID by the maker prior to delivery.

A maintenance agreement is concluded between the user and the maker for each of the devices 1 to 3. The maintenance agreement stipulates that the user accumulates a predetermined amount of maintenance costs each month for each of the devices 1 to 3. As shown in the diagram, the accumulative fee for each device is stored in correspondence with the device ID of each device in a table 4a for management of accumulative fees that is provided in the computer 4 of the user's system A.

On a predetermined day of each month, the user pays the accumulative fee to the maker via a finance company. Furthermore, as shown in the diagram, based on the data sent by the computer 4, the charges owed to the maker are stored as a customer ID, a device ID, and an accumulative fee in a payment table 7 of the finance company's server C, and on the payment day of each month these data are sent by the server C to the maker's server B.

As shown in the diagram, the maker's server B is provided with a point management table 6. The point management table 6 is provided in order to settle the user's maintenance costs and the like using points. For each device of each customer, the point management table 6 records the sum of the maintenance points converted each month from the accumulative fee, and the sum of the service points that are conferred in response to acts on the side of the user such as device usage and the purchase of parts, etc.

Maintenance points are given by converting into points the monthly accumulative fee, which is paid from the user to the maker via the finance company after delivery of the device, taking for example 100 yen as one point, and accumulating them for each device of each customer. It should be noted that it is also possible to provide differences between the point conversion ratios for each device model. When the maker performs chargeable maintenance for the user, the maker settles the maintenance costs by subtracting points for the maintenance costs from the maintenance points listed in the point management table 6 for that device of that user.

On the other hand, it is possible to give service points when so chosen by agreement between the maker and the user, as in the following cases for example.

(1) If the device uses consumables, and these consumables are provided for a fee by the maker, service points may be given in correspondence to the amount of consumption of consumables. It should be noted that the amount of consumption can be calculated by the quantity of consumables used, or it can be calculated by the monetary worth of purchased consumables. It should also be noted that "consumables" includes such items as the reagents used in measurement devices, for example.

(2) As in case (1) above, service points may be given in correspondence to the operation counts of a device (for example, the number of measurements or the like).

For this reason, operation records are stored in memories 1a to 3a inside the devices 1 to 3, so that service points can be calculated. For example, in the above case (1), the consumption of consumables can be stored as operation records in the memories 1a to 3a, and the records can be updated in the memories 1a to 3a for each usage of a consumable. Also, in the above case (2), the device operation counts can be stored as operation records in the memories 1a to 3a, and the records can be updated in the memories 1a to 3a each time the devices perform an operation.

Furthermore, at predetermined intervals or at an appropriate time, the data of the operation records in the memories 1a to 3a are sent together with the user's customer ID and the corresponding device IDs from the devices 1 to 3 via the communications network 5 to the maker's server B. When the server B receives the data of the operation records, it converts the received operation records into service points, and adds the points to the service points of those devices for that user in the point management table 6.

In this way, the cumulated service points for each device of each user can be added to the maintenance points, for example, after a predetermined period has elapsed, or when a predetermined number of points has been reached. Furthermore, it is also possible to apply discounts to maintenance charges or to the cost of consumables in correspondence to the number of service points, or to the cost of a new purchase of that device for that user. In this case, it should be agreed in advance that the rate of the discount will be raised stepwise as the number of points increases.

It should be noted that, other than the above cases (1) and (2), service points may be applicable for parts and services for which there is no agreement for settlement by maintenance points. In this case, the user pays the maker for the cost of those parts or services by cash or check, or via the finance company, and the maker adds service points in correspondence to those costs to the service points of that device of that user.

Furthermore, it is also possible to add bonus points to the maintenance points in accordance with the user's track record of usage. For example, it is conceivable that in order to give preferential treatment to a user who has used a device continuously over a long period, extra points are given for points after a certain period has elapsed since they have been accumulated, in accordance with that period. This method also leads to giving preferential treatment to users who have few device breakdowns. There are also various other examples of ways in which bonus points can be added, such as (1) for users who purchase large volumes of reagents and other consumables, (2) for users who install large numbers of the maker's devices, and (3) for users whose device does not break down for at least a certain period.

The way of giving bonus points is discretionary. For example, a predetermined number of points can be added simply for accumulated maintenance points, or a number of points obtained by applying a predetermined percentage to all or part of the accumulated points can be added.

Moreover, maker compensation points may be awarded for devices that have many breakdowns that are the responsibility of the maker.

It should be noted that the accumulated maintenance points and service points for each device of each user also can be passed on to new devices, for example when a user replaces a device with a new model. When a new device is purchased, it is also possible to discount from that price a sum in correspondence with the cumulated maintenance points or service points, or to apply a percentage discount on the listed price in accordance with the cumulated points.

As described above, with this maintenance cost management system, the user of each device accumulates maintenance points in the maker's server by accumulating comparatively small sums, for example each month. Moreover, maintenance costs can be settled between the user and the maker by subtracting points from these maintenance points in accordance with the maintenance costs when maintenance has been received. In this way, the user does not have a sense of burden for paying maintenance costs, and the maker is able to collect maintenance costs reliably.

Furthermore, by establishing service points in accordance with such items as the volume of consumables consumed, and adding these service points to the maintenance points, and by offering discounts and the like in accordance with the service points, it is possible to improve the usage frequency for that maker's devices, and an incentive can be given to continue to use the maker's devices.

It should be noted that this embodiment does not limit the present invention, and that various modifications can be made within the scope of the invention. For example, an arrangement in which the accumulation is carried out via a finance company is shown in FIG. 1, but it does not necessarily have to be carried out via such a company.

Furthermore, in the present embodiment, an example is shown in which a maker himself performs maintenance and collects payment for this, but it is also possible that maintenance is performed and payment collected by a reseller that stocks and sells the devices of the device maker, or by a business contracted by the device maker or the like.

INDUSTRIAL APPLICABILITY

As explained above, the present invention can provide a maintenance cost management system that makes it possible to reduce a user's sense of burden for paying maintenance costs.

The invention claimed is:

1. A maintenance cost management device, comprising:
a point storage portion that stores a device user's deposit points for a device that receives maintenance;
a conversion means that converts an accumulative fee paid regularly by the device user to deposit points;
an addition means that adds the deposit points converted by the conversion means to the device user's deposit points stored in the point storage portion; and
a subtracting means that, after a maintenance has been performed, subtracts a number of deposit points corresponding to a cost for the maintenance from the deposit points in the point storage portion to settle the cost for the maintenance;
wherein the point storage portion is further provided with a service point storage area that stores service points given in accordance with acts on the device user side, and the cost for the maintenance is settled taking into account the service points;
wherein an operation record of the device user's device is received from the device via a communications network, and service points calculated on the basis of the received operation record are added to the device user's service points stored in the point storage portion; and
wherein the operation record includes data related to the device's consumption volume of consumables.

2. The maintenance cost management device according to claim 1, wherein the point storage portion is provided, for each device of each device user, with an area that stores the deposit points.

3. The maintenance cost management device according to claim 1, wherein the service points are added to the deposit points.

4. The maintenance cost management device according to claim 1, wherein the service points subtracted from the deposit points are calculated by discounting for a percentage corresponding to the service points.

5. A combination of a user device and a maintenance cost management device, wherein the user device is connected via a communications network to the maintenance cost management device:
the maintenance cost management device, comprising:
a point storage portion that stores a device user's deposit points for a device that receives maintenance;
a conversion means that converts an accumulative fee paid regularly by the device user to deposit points;
an addition means that adds the deposit points converted by the conversion means to the device user's deposit points stored in the point storage portion;
a subtracting means that, after a maintenance has been performed, subtracts a number of deposit points corresponding to a cost for the maintenance from the deposit points in the point storage portion to settle the cost for the maintenance;
wherein the point storage portion is further provided with a service point storage area that stores service points given in accordance with acts on the device user side, and the cost for the maintenance is settled taking into account the service points;
wherein an operation record of the device user's device is received from that device via a communications network, and service points calculated on the basis of the received operation record are added to the device user's service points stored in the point storage portion; and
wherein the operation record includes data related to the device's consumption volume of consumables;
the user device, comprising:
an operation record storage portion that stores an operation record; and
a transmission portion that sends the operation record to the maintenance cost management device via the communications network.

6. A non-transitory computer-readable program storage medium on which a program is stored that executes processes of:
converting an accumulative fee paid regularly by a device user into deposit points;

adding the deposit points to the device user's deposit points in a point storage portion storing the device user's deposit points; and settling a cost for a maintenance after the maintenance has been performed by subtracting points from the deposit points in the point storage portion in accordance with the cost for the maintenance, wherein settling a cost for a maintenance includes taking into account service points, stored in a service point storage area of the point storage portion, the service point storage area storing service points given in accordance with acts on the device user side; and receiving an operation record of the device user's device from the device user's device via a communications network, and adding service points, calculated on the basis of the received operation record, to the device user's service points stored in the point storage portion, wherein the operation record includes data related, to the device's consumption volume of consumables.

7. A maintenance cost management method comprising:

converting an accumulative fee paid regularly by a device user into deposit points by a conversion means of a maintenance cost management device;

adding the deposit points to the device user's deposit points in a point storage portion storing the device user's deposit points by an addition means of the maintenance cost management device;

settling a cost for a maintenance after the maintenance has been performed by subtracting deposit points from the deposit points in the point storage portion in accordance with the cost for the maintenance by a subtracting means of the maintenance cost management device, wherein settling a cost for a maintenance includes taking into account service points, stored in a service point storage area of the point storage portion, the service point storage area storing service points given in accordance with acts on the device user side; and the maintenance cost management device receiving an operation record of the device user's device from the device user's device via a communications network, and adding service points, calculated on the basis of the received operation record, to the device user's service points stored in the point storage portion, wherein the operation record includes data related to the device's consumption volume of consumables.

* * * * *